(12) United States Patent
Gu et al.

(10) Patent No.: US 11,347,722 B2
(45) Date of Patent: May 31, 2022

(54) BIG DATA REGRESSION VERIFICATION METHOD AND BIG DATA REGRESSION VERIFICATION APPARATUS

(71) Applicant: Shanghai IceKredit, Inc., Shanghai (CN)

(72) Inventors: Lingyun Gu, Shanghai (CN); Zhipan Guo, Shanghai (CN); Wei Wang, Shanghai (CN); Junhong Zheng, Shanghai (CN); Jie Xie, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/388,014

(22) Filed: Jul. 29, 2021

(65) Prior Publication Data
US 2022/0100732 A1   Mar. 31, 2022

(30) Foreign Application Priority Data
Sep. 27, 2020   (CN) .......................... 202011031896.1

(51) Int. Cl.
*G06F 16/23*   (2019.01)
*G06F 9/445*   (2018.01)
*G06F 16/28*   (2019.01)
*G06K 9/62*   (2022.01)
*G06F 16/25*   (2019.01)

(52) U.S. Cl.
CPC ...... *G06F 16/2365* (2019.01); *G06F 9/44505* (2013.01); *G06F 16/2358* (2019.01); *G06F 16/252* (2019.01); *G06F 16/288* (2019.01); *G06K 9/6215* (2013.01)

(58) Field of Classification Search
CPC . G06F 16/2365; G06F 16/288; G06F 16/2358
See application file for complete search history.

(56) References Cited

U.S. PATENT DOCUMENTS

| | | | |
|---|---|---|---|
| 8,516,504 B1 * | 8/2013 | Park .......................... | G06F 8/24 719/328 |
| 10,043,037 B1 | 8/2018 | Middleman | |
| 2019/0258954 A1 * | 8/2019 | Daly ...................... | G06F 16/215 |

FOREIGN PATENT DOCUMENTS

| CN | 110008979 A | 7/2019 |
|---|---|---|
| CN | 111062486 A | 4/2020 |

* cited by examiner

*Primary Examiner* — Loc Tran
(74) *Attorney, Agent, or Firm* — Bayramoglu Law Offices LLC

(57) ABSTRACT

A big data regression verification method includes: adding first data source information, second data source information, and data feature information to a preset configuration file; when a script running instruction is detected, running a python automation script to establish a first data access channel to a database of a business system and a second data access channel to a database of a big data system based on the first data source information and the second data source information; processing and calculating data in the database of the business system and the database of the big data system according to the data feature information; and determining whether a calculated first result file corresponding to the database of the business system is consistent with a calculated second result file corresponding to the database of the big data system, to verify the data. A big data regression verification apparatus is further provided.

8 Claims, 2 Drawing Sheets

BIG DATA REGRESSION VERIFICATION METHOD AND BIG DATA REGRESSION VERIFICATION APPARATUS

CROSS REFERENCE TO THE RELATED APPLICATIONS

This application is based upon and claims priority to Chinese Patent Application No. 202011031896.1, filed on Sep. 27, 2020, the entire contents of which are incorporated herein by reference.

TECHNICAL FIELD

The present invention relates to the technical field of processing of big data, and more particularly, to a big data regression verification method and a big data regression verification apparatus.

BACKGROUND

With the development of big data, a database is used as a warehouse for storing, sharing, and managing data, and thus plays an important role in data analysis and data mining. Therefore, it is very important to verify processing of data in the database to ensure logical correctness of the data in the database for business execution. Most prior methods for verifying processing of the data in the database, however, are based on a manually compiled structured query language (SQL), and it is required to repeatedly modify the SQL in these verification methods.

SUMMARY

To resolve the above problems, the present invention provides a big data regression verification method and a big data regression verification apparatus, to process and calculate data in a database of a business system and in a database of a big data system based on data feature information added to a preset configuration file, and determine whether a calculated first result file corresponding to the database of the business system is consistent with a calculated second result file corresponding to the database of the big data system, to verify the data in the database of the business system and the database of the big data system without compiling and repeatedly modifying an SQL.

A first aspect of the embodiments of the present invention provides a big data regression verification method, applied to a computer device, where the method includes:

obtaining first data source information and second data source information, and adding the first data source information and the second data source information to a preset configuration file;

adding data feature information to the preset configuration file;

detecting whether a script running instruction is received, and if the script running instruction is detected, running a preset python automation script to establish a first data access channel to a database of a business system and a second data access channel to a database of a big data system based on the first data source information and the second data source information in the preset configuration file;

processing and calculating data in the database of the business system and the database of the big data system according to the data feature information through the first data access channel and the second data access channel respectively to obtain a first result file corresponding to the database of the business system and a second result file corresponding to the database of the big data system;

determining whether the first result file is consistent with the second result file;

if the first result file is consistent with the second result file, determining that the database of the business system and the database of the big data system pass data verification;

if the first result file is inconsistent with the second result file, extracting discrepant data between the first result file and the second result file, repairing the preset configuration file according to the discrepant data, and performing the step of processing and calculating the data in the database of the business system and the database of the big data system according to the data feature information through the first data access channel and the second data access channel respectively.

Optionally, the step of extracting the discrepant data between the first result file and the second result file includes:

obtaining a plurality of pieces of first result data in the first result file and a plurality of pieces of second result data in the second result file, where the first result data and the second result data have an information identifier, respectively;

calculating a similarity between first result data and second result data with an identical information identifier;

packaging first result data and second result data with a similarity being less than a predetermined value to obtain target result data; and obtaining the discrepant data according to the target result data.

Optionally, the step of repairing the preset configuration file according to the discrepant data includes:

obtaining a target information identifier of first result data or second result data corresponding to first target result data in the discrepant data;

determining a transmission path of the target information identifier, and extracting a data processing logic node in the transmission path; and when an association relationship between pointing information corresponding to the data processing logic node and the data feature information is determined, modifying the data feature information in the preset configuration file.

Optionally, the step of repairing the preset configuration file according to the discrepant data includes:

if the discrepant data indicates that a quantity of first result data in the first result file is inconsistent with a quantity of second result data in the second result file, obtaining, from the preset configuration file, a logical information list for processing and calculating the data in the database of the business system and the database of the big data system;

when the quantity of the first result data in the first result file is less than the quantity of the second result data in the second result file, adding a first list unit to the logical information list, where logical information in the first list unit is configured to instruct the computer device to complement the first result data in the first result file; and when the quantity of the first result data in the first result file is greater than the quantity of the second result data in the second result file, adding a second list unit to the logical information list, where logical information in the second list unit is configured to instruct the computer device to filter the first result data in the first result file.

Optionally, after the step of determining that the database of the business system and the database of the big data system pass data verification, the method further includes:

packaging and storing the first result file and the second result file.

A second aspect of the embodiments of the present invention provides a big data regression verification apparatus, applied to a computer device, where the apparatus includes:

an information adding module, configured to: obtain first data source information and second data source information, add the first data source information and the second data source information to a preset configuration file, and add data feature information to the preset configuration file;

a channel establishment module, configured to: detect whether a script running instruction is received, and if the script running instruction is detected, run a preset python automation script to establish a first data access channel to a database of a business system and a second data access channel to a database of a big data system based on the first data source information and the second data source information in the preset configuration file;

a data processing module, configured to: process and calculate data in the database of the business system and the database of the big data system according to the data feature information through the first data access channel and the second data access channel respectively to obtain a first result file corresponding to the database of the business system and a second result file corresponding to the database of the big data system; and a result determining module, configured to: determine whether the first result file is consistent with the second result file; if the first result file is consistent with the second result file, determine that the database of the business system and the database of the big data system pass data verification; if the first result file is inconsistent with the second result file, extract discrepant data between the first result file and the second result file, repair the preset configuration file according to the discrepant data, and perform the step of processing and calculating the data in the database of the business system and the database of the big data system according to the data feature information through the first data access channel and the second data access channel respectively.

Optionally, the result determining module is specifically configured to:

obtain a plurality of pieces of first result data in the first result file and a plurality of pieces of second result data in the second result file, where the first result data and the second result data have an information identifier, respectively;

calculate a similarity between first result data and second result data with an identical information identifier;

package first result data and second result data with a similarity being less than a predetermined value to obtain target result data; and obtain the discrepant data according to the target result data.

Optionally, the result determining module is further configured to:

obtain a target information identifier of first result data or second result data corresponding to first target result data in the discrepant data;

determine a transmission path of the target information identifier, and extract a data processing logic node in the transmission path; and when an association relationship between pointing information corresponding to the data processing logic node and the data feature information is determined, modify the data feature information in the preset configuration file.

Optionally, the result determining module is specifically configured to:

if the discrepant data indicates that a quantity of first result data in the first result file is inconsistent with a quantity of second result data in the second result file, obtain, from the preset configuration file, a logical information list for processing and calculating the data in the database of the business system and the database of the big data system;

when the quantity of the first result data in the first result file is less than the quantity of the second result data in the second result file, add a first list unit to the logical information list, where logical information in the first list unit is configured to instruct the computer device to complement the first result data in the first result file; and when the quantity of the first result data in the first result file is greater than the quantity of the second result data in the second result file, add a second list unit to the logical information list, where logical information in the second list unit is configured to instruct the computer device to filter the first result data in the first result file.

Optionally, after determining that the database of the business system and the database of the big data system pass data verification, the result determining module is further configured to:

package and store the first result file and the second result file.

The big data regression verification method and apparatus provided in the present invention perform the following operations: adding the first data source information, the second data source information, and the data feature information to the preset configuration file; when the script running instruction is detected, running the python automation script to establish the first data access channel to the database of the business system and the second data access channel to the database of the big data system based on the first data source information and the second data source information; processing and calculating the data in the database of the business system and the database of the big data system according to the data feature information added to the preset configuration file; and determining whether the calculated first result file corresponding to the database of the business system is consistent with the calculated second result file corresponding to the database of the big data system, to verify the data in the database of the business system and the database of the big data system. In this way, the data in the database can be verified without compiling and repeatedly modifying an SQL, thereby reducing verification time.

BRIEF DESCRIPTION OF THE DRAWINGS

To describe the technical solutions in the embodiments of the present invention more clearly, the following briefly describes the accompanying drawings required for describing the embodiments. It should be understood that, the following accompanying drawings show merely some embodiments of the present invention, and therefore should not be regarded as a limitation on the scope. A person of ordinary skill in the art may still derive other related drawings from these accompanying drawings without creative efforts.

DETAILED DESCRIPTION OF THE EMBODIMENTS

For the sake of a better understanding of the above technical solutions, the technical solutions in the present invention are described in detail with reference to the accompanying drawings and specific embodiments. It should be understood that the embodiments in the present invention and specific features in the embodiments are detailed descriptions of the technical solutions in the present invention, and are not intended to limit the technical solutions in the present invention. The embodiments in the present invention and technical features in the embodiments may be combined with each other in a non-conflicting situation.

Figure 1:
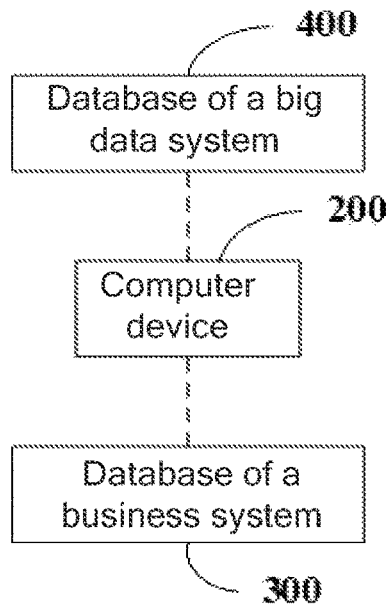
FIG. 1 is a schematic diagram of a communication framework of a big data regression verification system according to an embodiment of the present invention.
Figure 2:
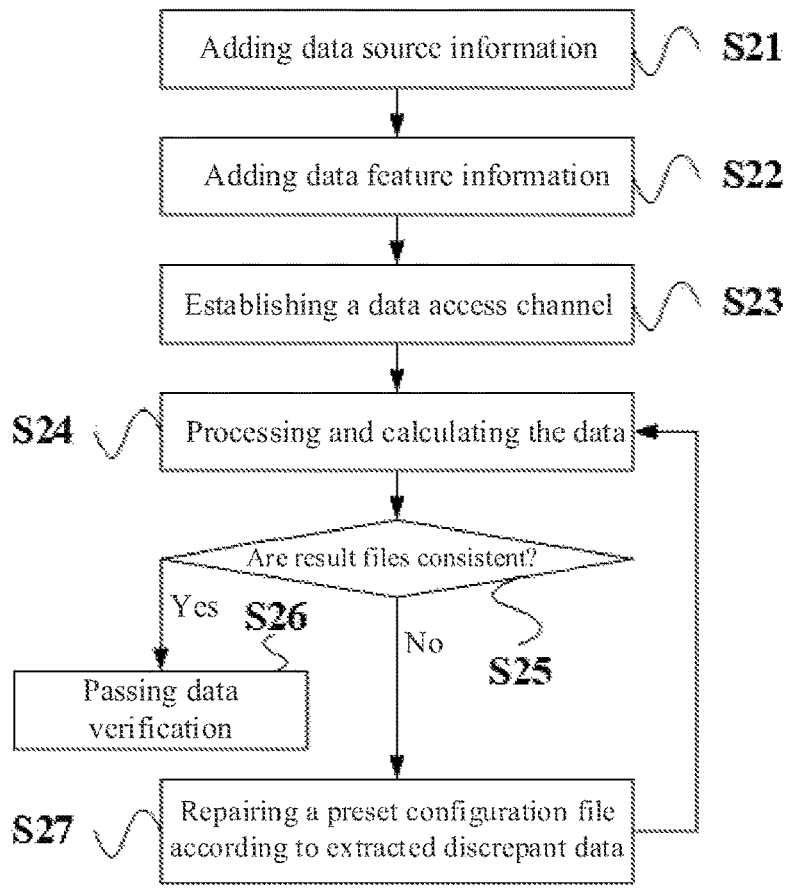
FIG. 2 is a flowchart of a big data regression verification method according to an embodiment of the present invention.

FIG. 1 is a schematic diagram of a communication framework of a big data regression verification system 100. The big data regression verification system 100 includes a computer device 200, a database 300 of a business system, and a database 400 of a big data system. Further, a big data regression verification method shown in FIG. 2 may be applied to the computer device 200 in FIG. 1, and may specifically include the following steps S21 to S27.

Step S21: Obtain first data source information and second data source information and add the first data source information and the second data source information to a preset configuration file.

In this embodiment, the first data source information is data source information of the business system (such as a personal scoring system), and the second data source information is data source information of the big data system. The data source information may include a uniform resource locator (URL), a username, a password, a database name, and the like. This is not limited herein.

Step S22: Add data feature information to the preset configuration file.

In this embodiment, the data feature information may be features of sampled and statistical data of to-be-verified data, and may include a database table name, a filtering condition, a calculation method (min, max, count, or the like), a field indicating a returned result, and the like.

Step S23: Detect whether a script running instruction is received, and if the script running instruction is detected, run a preset python automation script to establish a first data access channel to the database of the business system and a second data access channel to the database of the big data system based on the first data source information and the second data source information in the preset configuration file.

It can be understood that the first data access channel and the second data access channel are established, so that a communication connection between the computer device 200 and each of the database 300 of the business system and the database 400 of the big data system can be achieved, and the computer device 200 can obtain data access rights of the database 300 of the business system and the database 400 of the big data system.

Step S24: Process and calculate data in the database of the business system and the database of the big data system according to the data feature information through the first data access channel and the second data access channel respectively to obtain a first result file corresponding to the database of the business system and a second result file corresponding to the database of the big data system.

In this embodiment, data processing and calculation include but are not limited to logical processing and calculation such as query, sharpening, and reconstruction of the data in the database of the business system and the database of the big data system. This is not limited herein.

The first result file may be result_business_yyyyMMddHHmmss.data, and the second result file may be result_bigdata_yyyyMMddHHmmss.data.

Step S25: Determine whether the first result file is consistent with the second result file; if the first result file is consistent with the second result file, perform step S26; or if the first result file is inconsistent with the second result file, perform step S27.

Step S26: Determine that the database of the business system and the database of the big data system pass data verification.

Step S27: Extract discrepant data between the first result file and the second result file, repair the preset configuration file according to the discrepant data, and perform the step of processing and calculating the data in the database of the business system and the database of the big data system according to the data feature information through the first data access channel and the second data access channel respectively.

It can be understood that, if the first result file is inconsistent with the second result file, it indicates that regression verification of the data in the database of the business system and the database of the big data system fails. In this case, it is necessary to repair the preset configuration file, and continue to process and calculate the data in the database of the business system and the database of the big data system to perform regression verification on the data. In this way, data processing and calculation can be carried out quickly for a plurality of times by repairing the preset configuration file, without compiling and repeatedly modifying the SQL, thereby reducing regression verification time.

When the above steps S21 to S27 are performed, the first data source information, the second data source information, and the data feature information are added to the preset configuration file; when the script running instruction is detected, the python automation script is run to establish the first data access channel to the database of the business system and the second data access channel to the database of the big data system based on the first data source information and the second data source information; the data in the database of the business system and the database of the big data system is processed and calculated according to the data feature information added to the preset configuration file; and whether the calculated first result file corresponding to the database of the business system is consistent with the calculated second result file corresponding to the database of the big data system is determined, to verify the data in the database of the business system and the database of the big data system. In this way, the data in the database can be verified without compiling and repeatedly modifying an SQL, thereby reducing verification time.

In an alternative implementation, the step of extracting the discrepant data between the first result file and the second result file in step S27 may specifically include: obtaining a plurality of pieces of first result data in the first result file and a plurality of pieces of second result data in the second result file, where the first result data and the second result data have an information identifier, respectively; calculating a similarity between first result data and second result data with an identical information identifier;

packaging first result data and second result data with a similarity being less than a predetermined value to obtain target result data; and obtaining the discrepant data according to the target result data.

It can be understood that the discrepant data may be 0. ' ', " ", null, or other target result data, or may be another incorrectly calculated value.

Based on the above descriptions, the step of repairing the preset configuration file according to the discrepant data in step S27 specifically includes: obtaining a target information identifier of first result data or second result data corresponding to first target result data in the discrepant data; determining a transmission path of the target information identifier, and extracting a data processing logic node in the transmission path; and when an association relationship between pointing information corresponding to the data processing logic node and the data feature information is determined, modifying the data feature information in the preset configuration file.

It can be understood that the data feature information is modified, so that inconsistency between the first result file and the second result file can be eliminated, thereby continuously performing processing, calculation, and regression verification on the data in the database of the business system and the database of the big data system.

In an alternative implementation, the step of repairing the preset configuration file according to the discrepant data in step S27 may be achieved by performing the following steps S271 to S273.

Step S271: If the discrepant data indicates that a quantity of first result data in the first result file is inconsistent with a quantity of second result data in the second result file, obtain, from the preset configuration file, a logical information list for processing and calculating the data in the database of the business system and the database of the big data system.

Step S272: When the quantity of the first result data in the first result file is less than the quantity of the second result data in the second result file, add a first list unit to the logical information list, where logical information in the first list unit is configured to instruct the computer device to complement the first result data in the first result file.

Step S273: When the quantity of the first result data in the first result file is greater than the quantity of the second result data in the second result file, add a second list unit to the logical information list, where logical information in the second list unit is configured to instruct the computer device to filter the first result data in the first result file.

It can be understood that the logical information list can be modified by performing the above steps S271 to S273, to repair data processing and calculation logic, and ensure consistency between the first result file and the second result file that are obtained in subsequent data processing and calculation. In specific implementation, compared with repeated SQL modification, modifying the logical information list can save time and improve efficiency of regression verification.

Optionally, based on step S26, if the first result file is consistent with the second result file, the first result file and the second result file may be packaged and stored, and a "verification succeeded" field is written into a file obtained after the first result file and the second result file are packaged and stored.

It can be understood that based on the above content, regression verification of big data can be performed automatically based on whether the first result file is consistent with the second result file, thereby shortening regression verification time and improving verification accuracy. In addition, when the first result file is inconsistent with the second result file, related information can be modified in real time and verification can be performed again. This can greatly improve iteration efficiency of big data development.

Figure 3:
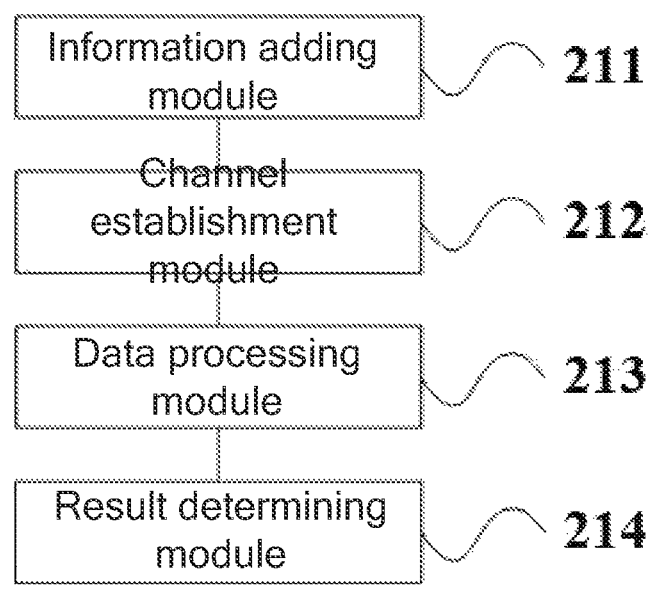
FIG. 3 is a block diagram of modules of a big data regression verification apparatus according to an embodiment of the present invention.

Based on the above inventive concept, a big data regression verification apparatus 210 is provided, as shown in FIG. 3. The apparatus includes:

an information adding module 211, configured to: obtain first data source information and second data source information, add the first data source information and the second data source information to a preset configuration file, and add data feature information to the preset configuration file;

a channel establishment module 212, configured to: detect whether a script running instruction is received, and if the script running instruction is detected, run a preset python automation script to establish a first data access channel to a database of a business system and a second data access channel to a database of a big data system based on the first data source information and the second data source information in the preset configuration file;

a data processing module 213, configured to: process and calculate data in the database of the business system and the database of the big data system according to the data feature information through the first data access channel and the second data access channel respectively to obtain a first result file corresponding to the database of the business system and a second result file corresponding to the database of the big data system; and a result determining module 214, configured to: determine whether the first result file is consistent with the second result file; if the first result file is consistent with the second result file, determine that the database of the business system and the database of the big data system pass data verification; if the first result file is inconsistent with the second result file, extract discrepant data between the first result file and the second result file, repair the preset configuration file according to the discrepant data, and perform the step of processing and calculating the data in the database of the business system and the database of the big data system according to the data feature information through the first data access channel and the second data access channel respectively.

Optionally, the result determining module 214 is specifically configured to:

obtain a plurality of pieces of first result data in the first result file and a plurality of pieces of second result data in the second result file, where the first result data and the second result data have an information identifier, respectively;

calculate a similarity between first result data and second result data with an identical information identifier;

package first result data and second result data with a similarity being less than a predetermined value to obtain target result data; and obtain the discrepant data according to the target result data.

Optionally, the result determining module 214 is further configured to:

obtain a target information identifier of first result data or second result data corresponding to first target result data in the discrepant data;

determine a transmission path of the target information identifier, and extract a data processing logic node in the transmission path; and when an association relationship between pointing information corresponding to the data processing logic node and the data feature information is determined, modify the data feature information in the preset configuration file.

Optionally, the result determining module 214 is specifically configured to:

if the discrepant data indicates that a quantity of first result data in the first result file is inconsistent with a quantity of second result data in the second result file, obtain, from the preset configuration file, a logical information list for processing and calculating the data in the database of the business system and the database of the big data system;

when the quantity of the first result data in the first result file is less than the quantity of the second result data in the second result file, add a first list unit to the logical information list, where logical information in the first list unit is configured to instruct the computer device to complement the first result data in the first result file; and when the quantity of the first result data in the first result file is greater than the quantity of the second result data in the second result file, add a second list unit to the logical information list, where logical information in the second list unit is configured to instruct the computer device to filter the first result data in the first result file.

Optionally, after determining that the database of the business system and the database of the big data system pass data verification, the result determining module 214 is further configured to:

package and store the first result file and the second result file.

To sum up, the big data regression verification method and the big data regression verification apparatus provided in the present invention perform the following operations: adding the first data source information, the second data source information, and the data feature information to the preset configuration file; when the script running instruction is detected, running the python automation script to establish the first data access channel to the database of the business system and the second data access channel to the database of the big data system based on the first data source information and the second data source information; processing and calculating the data in the database of the business system and the database of the big data system according to the data feature information added to the preset configuration file; and determining whether the calculated first result file corresponding to the database of the business system is consistent with the calculated second result file corresponding to the database of the big data system, to verify the data in the database of the business system and the database of the big data system. In this way, the data in the database can be verified without compiling and repeatedly modifying an SQL, thereby reducing verification time.

Described above are merely embodiments of the present invention and are not intended to limit the present invention. Various changes and modifications can be made to the present invention by those skilled in the art. Any modifications, equivalent replacements, improvements, etc. made within the spirit and principle of the present invention should be included within the protection scope of the claims of the present invention.

What is claimed is:

1. A big data regression verification method, applied to a computer device, comprising:
    obtaining first data source information and second data source information, and adding the first data source information and the second data source information to a preset configuration file;
    adding data feature information to the preset configuration file;
    detecting whether a script running instruction is received, and when the script running instruction is detected, running a preset python automation script to establish a first data access channel to a database of a business system and a second data access channel to a database of a big data system based on the first data source information and the second data source information in the preset configuration file;
    processing and calculating data in the database of the business system and the database of the big data system according to the data feature information through the first data access channel and the second data access channel respectively to obtain a first result file corresponding to the database of the business system and a second result file corresponding to the database of the big data system;
    determining whether the first result file is consistent with the second result file;
    when the first result file is consistent with the second result file, determining that the database of the business system and the database of the big data system pass data verification;
    when the first result file is inconsistent with the second result file, extracting discrepant data between the first result file and the second result file, repairing the preset configuration file according to the discrepant data, and performing the step of processing and calculating the data in the database of the business system and the database of the big data system according to the data feature information through the first data access channel and the second data access channel respectively;
    wherein the step of extracting the discrepant data between the first result file and the second result file comprises:
    obtaining a plurality of pieces of first result data in the first result file and a plurality of pieces of second result data in the second result file, wherein the first result data and the second result data have an information identifier, respectively;
    calculating a similarity between first result data and second result data with an identical information identifier;
    packaging first result data and second result data with a similarity being less than a predetermined value to obtain target result data; and
    obtaining the discrepant data according to the target result data.

2. The big data regression verification method according to claim 1, wherein the step of repairing the preset configuration file according to the discrepant data comprises:
    obtaining a target information identifier of first result data or second result data corresponding to first target result data in the discrepant data;
    determining a transmission path of the target information identifier, and extracting a data processing logic node in the transmission path; and
    when an association relationship between pointing information corresponding to the data processing logic node and the data feature information is determined, modifying the data feature information in the preset configuration file.

3. The big data regression verification method according to claim 1, wherein the step of repairing the preset configuration file according to the discrepant data comprises:
    when the discrepant data indicates that a quantity of first result data in the first result file is inconsistent with a quantity of second result data in the second result file, obtaining, from the preset configuration file, a logical information list for processing and calculating the data in the database of the business system and the database of the big data system;

when the quantity of the first result data in the first result file is less than the quantity of the second result data in the second result file, adding a first list unit to the logical information list, wherein logical information in the first list unit is configured to instruct the computer device to complement the first result data in the first result file; and when the quantity of the first result data in the first result file is greater than the quantity of the second result data in the second result file, adding a second list unit to the logical information list, wherein logical information in the second list unit is configured to instruct the computer device to filter the first result data in the first result file.

4. The big data regression verification method according to claim 1, wherein after the step of determining that the database of the business system and the database of the big data system pass data verification, the big data regression verification method further comprises:

packaging and storing the first result file and the second result file.

5. A big data regression verification apparatus, applied to a computer device, comprising:

a processor;

an information adding module the processor, configured to: obtain first data source information and second data source information, add the first data source information and the second data source information to a preset configuration file, and add data feature information to the preset configuration file;

a channel establishment module the processor, configured to: detect whether a script running instruction is received, and when the script running instruction is detected, run a preset python automation script to establish a first data access channel to a database of a business system and a second data access channel to a database of a big data system based on the first data source information and the second data source information in the preset configuration file;

a data processing module the processor, configured to: process and calculate data in the database of the business system and the database of the big data system according to the data feature information through the first data access channel and the second data access channel respectively to obtain a first result file corresponding to the database of the business system and a second result file corresponding to the database of the big data system; and a result determining module the processor, configured to: determine whether the first result file is consistent with the second result file; when the first result file is consistent with the second result file, determine that the database of the business system and the database of the big data system pass data verification; when the first result file is inconsistent with the second result file, extract discrepant data between the first result file and the second result file, repair the preset configuration file according to the discrepant data, and perform the step of processing and calculating the data in the database of the business system and the database of the big data system according to the data feature information through the first data access channel and the second data access channel respectively;

wherein extracting the discrepant data between the first result file and the second result file comprises result determining module is specifically configured to:

obtain a plurality of pieces of first result data in the first result file and a plurality of pieces of second result data in the second result file, wherein the first result data and the second result data have an information identifier, respectively;

calculate a similarity between first result data and second result data with an identical information identifier;

package first result data and second result data with a similarity being less than a predetermined value to obtain target result data; and obtain the discrepant data according to the target result data.

6. The big data regression verification apparatus according to claim 5, wherein the processor result determining module is further configured to:

obtain a target information identifier of first result data or second result data corresponding to first target result data in the discrepant data;

determine a transmission path of the target information identifier, and extract a data processing logic node in the transmission path; and when an association relationship between pointing information corresponding to the data processing logic node and the data feature information is determined, modify the data feature information in the preset configuration file.

7. The big data regression verification apparatus according to claim 5, wherein the processor result determining module is specifically configured to:

when the discrepant data indicates that a quantity of first result data in the first result file is inconsistent with a quantity of second result data in the second result file, obtain, from the preset configuration file, a logical information list for processing and calculating the data in the database of the business system and the database of the big data system;

when the quantity of the first result data in the first result file is less than the quantity of the second result data in the second result file, add a first list unit to the logical information list, wherein logical information in the first list unit is configured to instruct the computer device to complement the first result data in the first result file; and when the quantity of the first result data in the first result file is greater than the quantity of the second result data in the second result file, add a second list unit to the logical information list, wherein logical information in the second list unit is configured to instruct the computer device to filter the first result data in the first result file.

8. The big data regression verification apparatus according to claim 5, wherein after determining that the database of the business system and the database of the big data system pass data verification, the processor result determining module is further configured to:

package and store the first result file and the second result file.

* * * * *